July 20, 1926.
A. A. GARDNER ET AL
HOEING MACHINE.
Filed Nov. 11, 1924
1,592,825
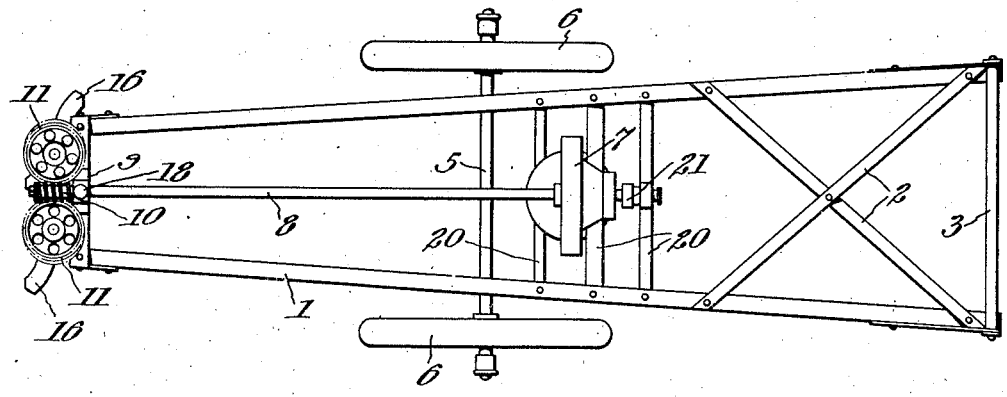
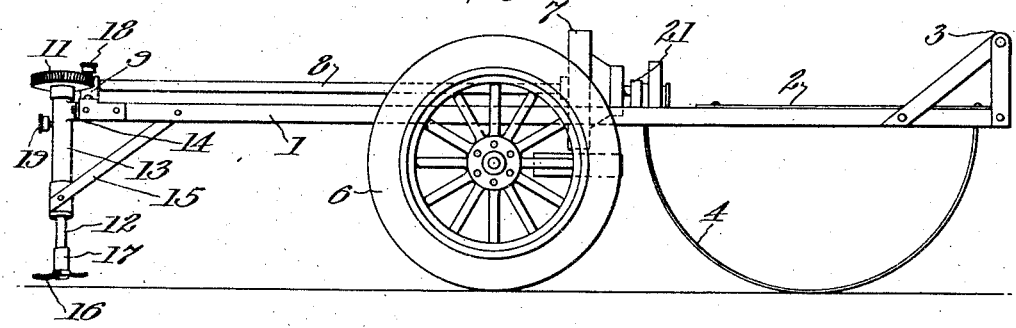
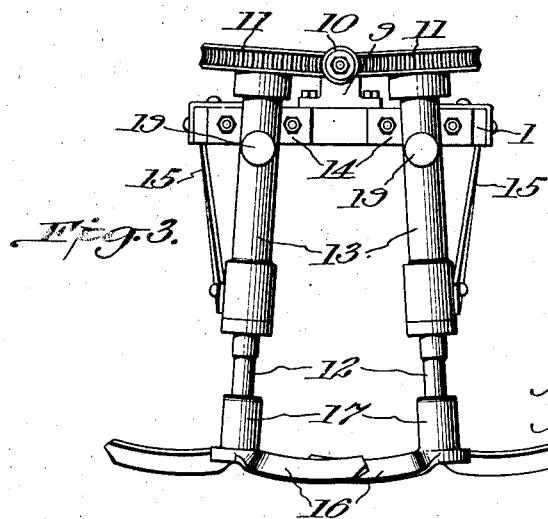
Inventors:
Albertus A. Gardner
Miranda M. Gardner
by
Attorney.

Patented July 20, 1926.

1,592,825

UNITED STATES PATENT OFFICE.

ALBERTUS A. GARDNER AND MIRANDA M. GARDNER, OF FORT MYERS, FLORIDA.

HOEING MACHINE.

Application filed November 11, 1924. Serial No. 749,241.

The object of this invention is to provide a machine for use in hoeing, particularly in orange groves, and generally for garden work.

The invention consists in its present preferred form of a frame or chassis, on which one or more rotary hoeing devices are mounted and driven by suitable motive power on the machine, the whole being so balanced that the operator may control the depth of cut of the hoes, as we will proceed now to explain and finally claim.

In the accompanying drawings illustrating the invention, in the several figures of which like parts are similarly designated, Figure 1 is a top plan view, and Fig. 2 is a side elevation, illustrating one embodiment of the invention. Fig. 3 is a front elevation on a larger scale.

The frame or chassis 1, may be of any approved construction and material, preferably stock angle metal, and it may be of truncated wedge shape in plan view, as shown in Fig. 1, or of other suitable configuration. For strengthening purposes the rear of the frame or chassis may be braced by the cross-braces 2. The frame or chassis also may be provided with the elevated handle member 3 for the use of the operator in guiding and manipulating the machine. This rear end also may have the ground-rest members 4. The frame or chassis is mounted on an axle 5 having a pair of wheels 6, although any number of wheels may be used.

7 is a motor of any suitable construction and power, mounted upon the frame or chassis, and provided with a shaft 8 extending longitudinally forward of the frame or chassis and there mounted in a bearing 9. At its front end the shaft is provided with a worm 10 which is in mesh with the worm wheels 11. These worm wheels 11 are fixed to upright shafts 12 which are mounted in sleeve-like housings 13 secured to the front of the frame or chassis by brackets 14 and stays 15, and these housings preferably are inclined toward one another at the top.

The shafts 12 are provided on their bottoms with the hoes 16, herein shown as two-bladed implements, adapted to be rotated in opposite directions.

The blades of the hoes are herein shown as radiating from common hubs 17 which are arranged to turn with the shafts 12. Each hoe blade is curved longitudinally and inclined transversely in order to function efficiently. Where the hoes are used in pairs, their blades follow one another in the cycle of rotation.

Of course, the machine may be equipped with only one hoe, or it may be equipped with two or more hoes.

As power is applied, the hoes are rotated and by contact with the earth serve to move or propel the machine.

The shaft bearing 9 and the sleeve-like housings 13 may be provided respectively with grease cups 18 and 19.

Cross-bars 20 fixed to the frame or chassis may be used to support the motor, and one of these cross bars may support a rear bearing 21 for the shaft 8.

An operator grasping the handle 3 is able to guide the machine in its work in the field or between plants or trees, and he is also able to raise or lower the hoes so as to cut less or more deeply into the soil.

The machine runs equally well toward or from the operator, depending on the direction of rotation of the hoes. When the machine is running toward the operator he has the advantage of walking on unbroken or relatively level ground.

The blades of the hoes are set to balance the resistance of the earth, and as they stand at an angle they catch deeper and stronger in the soil at their lower and inside points than at their outer portions, and so move the machine in a direction opposite to that in which they are turning. When nicely adjusted the hoes carry the weight of the machine with very little or no pushing or pulling on the part of the operator.

The operator by oscillating or tilting the machine can cover a very great width at even depth.

More blades at the same angle may be used for larger and heavier machines.

The operator is able to put upon the hoes the pressure sufficient to keep them in operative position, as well as to regulate their depth of cut, as desired.

Variations in the details of construction are permissible within the principle of the invention and the scope of the claims following.

What we claim is:—

1. A hoeing machine, comprising a wheeled frame and carrying a motor, a horizontal shaft driven by said motor and extending to the front of the machine, and an upright rotary hoeing device dependingly mounted on the front of the machine and in operative connection with the said shaft and having radially arranged blades curved longitudinally and inclined transversely and thereby adapted to engage the earth to move the machine and stir up the earth.

2. A hoeing machine, comprising a wheeled frame and carrying a motor, a shaft driven by said motor and extending to the front of the machine, and an upright rotary hoeing device dependingly mounted on the front of the machine and in operative connection with the said shaft, said hoeing device comprising radially arranged blades having inclined earth-engaging active surfaces.

3. A wheeled hoeing machine, provided with a shaft connected with the motor and extending forwardly, a pair of downwardly divergent shafts mounted on the front of the machine and having bladed hoes at their lower ends, and worm gearing connecting the several shafts.

4. A hoeing machine, comprising a wheel-supported frame, a motor mounted on the frame and having a shaft extending forwardly of the frame, upright shafts mounted on the front of the frame and diverging downward and having on their lower ends bladed hoes, gearing connecting the several shafts to impart rotary motion to the bladed hoes, rests applied to the rear of the machine, and an operator's handle.

5. A hoeing machine, comprising a frame, a wheel mount therefor, the plane of connection of the mount with the frame being such that the frame is nearly balanced, a motor mounted on the frame and having a shaft extending forwardly of the frame and provided with a worm, upright shafts mounted on the front of the frame and diverging downward and having on their lower ends bladed hoes and on their upper ends worm wheels, said wheels meshing with the worm on the motor shaft, and hand guiding means at the rear of the machine.

In testimony whereof we have hereunto set our hands this 8th day of November, A. D., 1924.

ALBERTUS A. GARDNER.
MIRANDA M. GARDNER.